Patented May 1, 1951

2,550,914

UNITED STATES PATENT OFFICE 2,550,914

VETERINARY COMPOSITIONS FOR VAGINITIS AND RELATED DISORDERS

John W. Cunkelman, Fort Dodge, Iowa, and John A. Whiting, Kansas City, Mo., assignors to Fort Dodge Laboratories, Inc., Fort Dodge, Iowa, a corporation of Delaware No Drawing. Application February 17, 1948, Serial No. 9,016

5 Claims. (Cl. 167—53.2)

This invention relates to a new and useful composition for the treatment of vaginitis, cervicitis and allied disorders of the genitalia.

In human genital inflammations, vaginitis, cervicitis, metritis, and disorders of similar nature are often manifested by leukorrheal discharge and generally accompanied by local tenderness, pain and general distress. Treatment is usually of extended character depending on the etiology, such diseases often being traced to bacterial and protozoan origin.

It was likewise been found that breeding unsoundness in cattle can many times be traced to nodular or granular vaginitis and cervicitis and accompanying metritis. These conditions are often found to be of such severity as to interfere with conception.

Many treatments have been tried in the past using such diverse medications as caustic iodine, gentian violet, silver picrate, nitric acid, iodized oil, bismuth formic iodide, silver picrate and kaolin, and irrigation solutions containing various types of germicidal agents, but they have largely proved ineffective in the double task of arresting infection and inducing rapid epithelial repair, both actions being necessary to the successful treatment of these disorders. Moreover, a number of the more effective medications are relatively expensive in the amounts necessary for complete treatment. In large measure, these medicaments are only partially effective or require lengthy treatment before a complete cure can be achieved.

We have discovered a new and highly effective composition for the treatment of these genital diseases which affords a complete, more rapid and satisfactory recovery in a large and impressive number of cases treated. The new composition involves essentially three basic ingredients, namely, a bactericidal and/or protozoacidal agent, a substance effective for epithelial repair and an adsorptive and absorbing agent capable of slowly releasing active agents and absorbing toxins and exudate.

The adsorptive material must possess the properties of adhering to the tissues, exercising a cleansing action by absorbing exudate and so retaining the other ingredients as to permit their availability for bactericidal and/or protozoacidal action and epithelial repair over a long duration of time. At the same time, the cleansing action exposes the mucous membrane and permits the other active ingredients to come into direct contact with the affected area. As suitable adsorptives various substances such as bentonite, kaolin, magnesium trisilicate, fuller's earth, talc and all other silica earths, silica gels and other materials of like nature which possess the desired action may be used.

The bactericidal and/or protozoacidal agent is selected from the general class of aliphatic and aliphatic-aromatic quaternary ammonium compounds which are effective for this purpose. As examples of this class of agents suitable for use in our compositions may be mentioned, alkyl-trimethyl-ammonium bromide, alkyl-dimethyl-benzyl-ammonium chloride, decamethylene bis-(decyldimethyl ammonium bromide), (p-tert. octylphenoxyethoxyethyl) dimethyl benzyl ammonium chloride, also called (p-diisobutylphenoxyethoxyethyl) dimethyl benzyl ammonium chloride and (p-diisobutylcresoxyethoxyethyl) dimethyl benzyl ammonium chloride. The bactericidal action of the first two types of quaternary compounds is manifested when the "alkyl" radicals are of high molecular weight, having from about 10 to about 20 carbon atoms in the molecule.

The third essential ingredient in the composition is the hormone or hormone-like material. The hormones suitable for use are preferably the steroidal, oestrogenic hormones or synthetic, non-steroid oestrogenically active compounds such as diethylstilbestrol or hexestrol. Suitable also are the proteinaceous gonadotropic hormones, of the anterior lobe of the pituitary gland and chorionic gonadotropin which are obtained from natural sources, such as from human urine or from pregnant mare's serum in a manner known to the art.

The oestrogenically active compounds may be obtained either from natural sources or produced synthetically. Thus oestrone, estriol estradiol, conjugated oestrogens or the salts thereof, the oestrogenically active compounds such as diethylstilbestrol, hexestrol or in fact any estrogenic hormone or compound which produces estrus in the lower mammals is useful in the composition. These materials have the ability of inducing rapid epithelial repair when used in the composition but alone are of no practical value in the presence of marked infection.

As a specific example of our composition the following specific ingredients and their amounts are given as an illustrative composition but it is to be clearly understood that the invention is not limited to the specific elements mentioned nor are the amounts to be regarded as rigid and invariable. Other compounds, falling within the class of the compounds mentioned as is well known to those skilled in the art may be used and variations in the amounts is also contemplated:

| | Percent by weight |
|---|---|
| Diethylstilbestrol | 0.07 |
| (p - diisobutyl - phenoxy - ethoxyethyl) dimethyl-benzylammonium chloride | 0.20 |
| Kaolin | 99.73 |

The hormone or hormone-like compound may be varied in amount from about 0.01 to about 0.5 percent by weight based on the sum of the three essential ingredients while the quaternary ammonium compound may be varied from about 0.10 to about 0.5 percent by weight also based on the sum of the three essential ingredients. The adsorbent may be present to an extent of about 99.89% by weight or less, depending on the amounts of the other elements of the composition.

The composition may be either in the form of a liquid, an ointment or as a powder. Since it has been found that longer and better contact of the active ingredients with the diseased tissue can be achieved when the composition is in a relatively dry state, the solid, powdered form, is preferred.

Besides the three essential ingredients described above, the composition may comprise other ingredients designed for the treatment of accompanying disorders and to achieve related beneficial effects. Thus, aluminum hydroxide or phosphate gel may be incorporated in order to obtain an astringent and/or peptizing action as well as to obtain the composition in liquid form. Inert liquids, jellies and ointment bases are also contemplated as diluents and excipients.

When the composition is insufflated or otherwise applied to the vaginal tract, it adheres to the walls, absorbs the serous exudates, removes all mucoid material, and exposes the affected mucous membrane. The other active ingredients are then slowly released and come in contact with the affected area, destroying pathogenic microorganisms, stimulating epithelial repair and restoring the normal (or protective) vaginal flora, thus tending to prevent reinfection.

We claim:

1. A veterinary composition comprising kaolin, (diisobutylphenoxy-ethoxyethyl) dimethylbenzyl ammonium chloride and diethylstilbestrol.

2. A veterinary composition comprising a quaternary ammonium halide having protozoacidal properties selected from the group consisting of aliphatic ammonium halides and aliphatic-aromatic ammonium halides in an amount from about 0.1 to about 0.5 percent, an oestrogenically-active compound in an amount from about 0.01 to about 0.5 percent, and a relatively large amount of kaolin as an adsorbing agent.

3. A composition effective for veterinary use comprising a powdered, solid adsorbent, a quaternary ammonium compound selected from the group consisting of an aliphatic ammonium halide and an aliphatic-aromatic ammonium halide, and an oestrogenically active hormonal compound effective for epithelial repair.

4. A veterinary composition comprising a finely divided solid adsorbent, a protozoacidal quaternary ammonium halide of the group consisting of aliphatic ammonium halides and aliphatic-aromatic ammonium halides, and a compound effective for epithelial repair selected from the group consisting of oestrogenically active compounds and gonadotropic compounds.

5. A composition effective for veterinary use comprising a finely divided solid adsorbent, a gonadotropic hormone derived from the anterior lobe of the pituitary gland and a protozoacidal quaternary ammonium halide of the group consisting of aliphatic ammonium halides and aliphatic-aromatic ammonium halides.

JOHN W. CUNKELMAN.
JOHN A. WHITING.

REFERENCES CITED

The following references are of record in the file of this patent:

Gutman, Modern Drug Encyclopedia, 3rd ed., 1946, pages 167, 168, 235, 564, 565.

Johnson, Proceedings of the Society of Experimental Biology and Medicine, November 1943, pages 245 to 248.

Morgan, American Journal of Veterinary Research, January 1946, pages 45 to 51.